United States Patent [19]
Jones

[11] 3,794,415
[45] Feb. 26, 1974

[54] ROLLING LOOP TRANSPORT MECHANISM

[75] Inventor: Peter Ronald Wright Jones, Brisbane, Queensland, Australia

[73] Assignee: Multiscreen Corporation Limited, Galt, Ontario, Canada

[22] Filed: July 13, 1972

[21] Appl. No.: 271,503

[52] U.S. Cl. .................. 352/184, 226/55, 226/95, 226/97, 226/113, 226/155
[51] Int. Cl. .............................................. G03b 1/20
[58] Field of Search ....... 226/2, 55, 59, 95, 97, 113, 226/152, 155, 156, 4; 352/184

[56] References Cited
UNITED STATES PATENTS
3,600,073   8/1971   Shaw................................ 226/55 X Primary Examiner—Richard A. Schacher
Assistant Examiner—Gene A. Church

[57] ABSTRACT

The invention provides a mechanism for transporting photographic film past an aperture in a projector, camera or other motion picture machine, and more particularly to a rolling loop film transport mechanism which transports film between a rotor and a stator for placing frame lengths of the film against an aperture in the stator such that each frame length then has substantially the same curvature as the aperture independently of the curvature of the stator.

2 Claims, 13 Drawing Figures

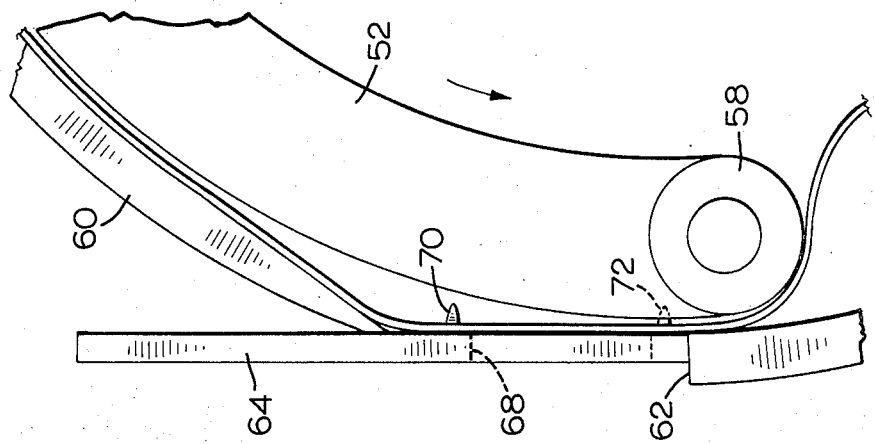
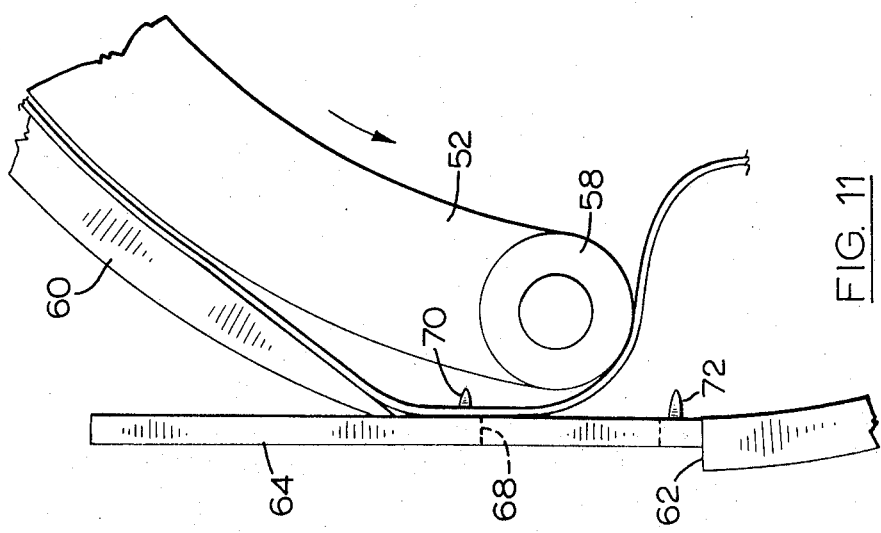
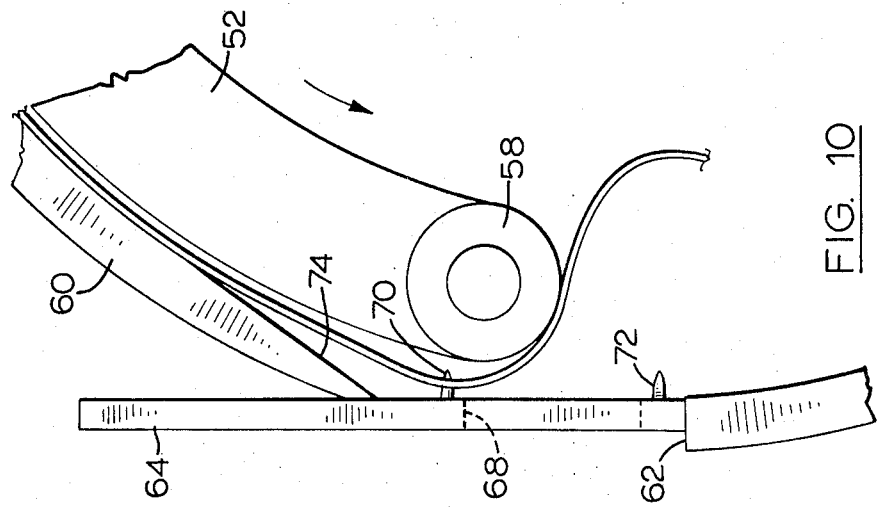

ROLLING LOOP TRANSPORT MECHANISM

This invention relates to a mechanism for transporting photographic film past an aperture in a projector, camera or other motion picture machine, and more particularly to a rolling loop film transport mechanism which transports film between a rotor and a stator for placing frame lengths of the film against an aperture in the stator such that each frame length then has substantially the same curvature as the aperture independently of the curvature of the stator.

A rolling loop film transport mechanism has been developed and described in U.S. Pat. No. 3,494,524 to P.R.W. Jones. The mechanism includes a stator and a rotor co-operating with the stator to define a passage through which film is transported. The rotor has gaps for receiving film loops and film is fed through an inlet in the stator into the passageway and withdrawn through an outlet in the stator. An aperture is positioned intermediate the inlet and the outlet and moving means is provided for feeding the film into the inlet at a controlled speed relative to the speed of rotation of the rotor, and for withdrawing film from the outlet at the said controlled speed. A locating means co-operates with the film moving means for gradually increasing and then gradually decreasing the film loop in the gap for intermittently holding the film in fixed position in registration with the aperture. This mechanism holds the film in a curved position, the curvature being substantially the same as the curvature of the stator and the optics associated with the mechanism must be desired to accommodate this curvature.

While this mechanism has proven satisfactory, it is desirable in some instances to have the film laid over the aperture such that the film has a different curvature from that of the stator, and in some cases it is preferable that the film be flat when laid over the aperture.

For the purposes of the present description, the term 'curvature' applied to the aperture includes a flat aperture having an axis of curvature at infinity on a line normal to the aperture and drawn from the centre of the aperture.

According to a particular embodiment of the present invention, a film transport mechanism is provided for a motion picture machine in which a film is intermittently transported through a predetermined frame length in relation to an aperture, said film transport mechanism comprising: a stator curved about an axis of curvature; a rotor cooperating with said stator to define a passage for said film and rotatable about said axis, said rotor having gaps for receiving film loops; an inlet in said stator through which said film is fed into said passage; an outlet in said stator through which said film is withdrawn from said passage; an aperture plate coupled to the stator intermediate said inlet and said outlet and defining the aperture, the plate including an inner surface having a curvature different from that of the stator, the axis of curvature of the plate surface being parallel to and spaced from the axis of curvature of the stator towards the inlet by an amount substantially equal to half of the circumferential extend of the aperture; film moving means for feeding said film into said inlet at a controlled speed relative to the speed of said rotor and for withdrawal of said film from said outlet at said controlled speed; and film locating means coupled to the stator for co-operating with said film moving means to gradually increase and then gradually decrease said film loop in said gap and to intermittently hold said film in fixed position in registration with said aperture plate surface about the aperture.

The invention will be better understood with reference to the drawings, wherein:

FIGS. 9 to 12 are diagrammatic views illustrating the operation of the transport mechanism.

Figure 1:
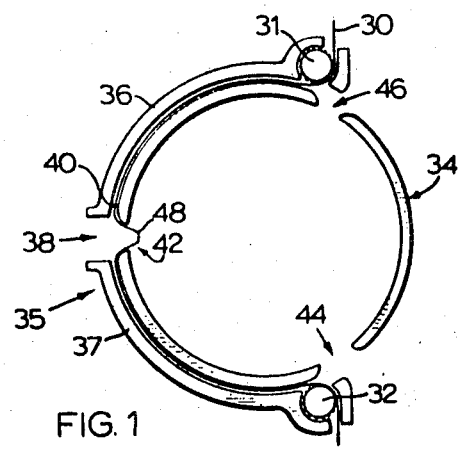
FIGS. 1 to 6 are diagrammatic views of a rolling loop film transport mechanism drawn in sequence to illustrate the principal of operation of the mechanism.
Figure 2:
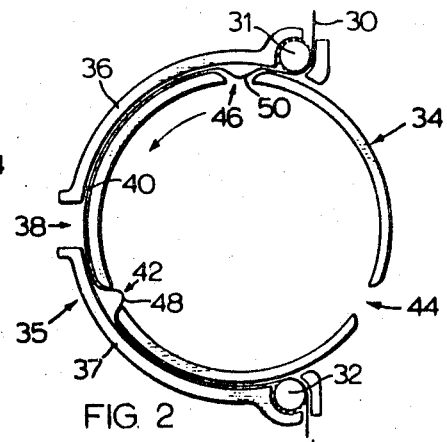
Figure 3:
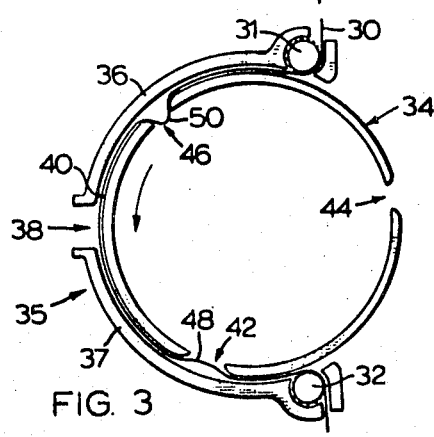
Figure 4:
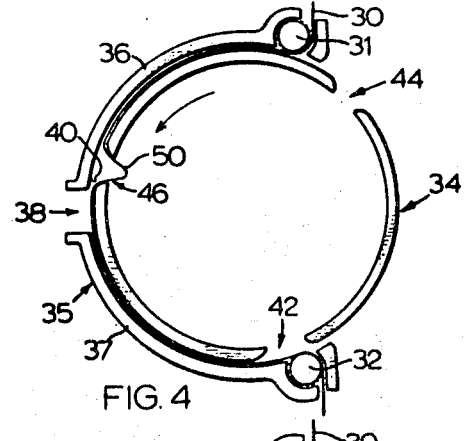

Reference is first made to FIGS. 1 to 6 to describe the principal of operation of a rolling loop film transport mechanism similar to that described in the aforementioned U.S. Pat. No. 3,494,524. A film 30 is fed into the mechanism at a predetermined rate by a driven inlet sprocket 31 and is drawn from the mechanism by a driven outlet sprocket 32 at the same predetermined rate. An annular rotor 34 is driven at constant speed about its axis inside a concentric stator 35 which includes an inlet portion 36 and an outlet portion 37. The portions 36 and 37 are fixed about a projection aperture 38 with sufficient radial clearance from the rotor 34 for the film to move freely along a passage between the stator and rotor. During projection, the film 30 is located by a fixed pin 40 which is attached to the inlet stator 36 adjacent the aperture 38. The rotor has three equally spaced peripheral gaps 42, 44 and 46 in which film loops are formed and moved around the stator 35 by the rotor 34. Although this arrangement is used for the purpose of illustration it will be evident that two or more gaps can be used with a corresponding change in the position of the inlet and the outlet.

Figure 5:
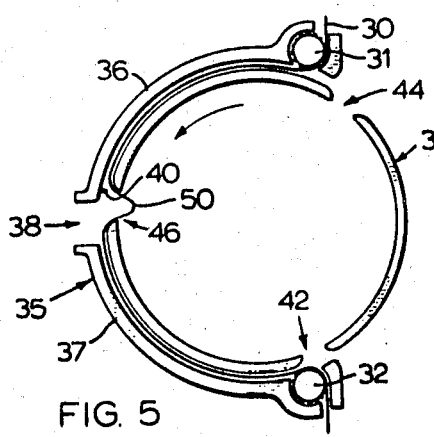
Figure 6:
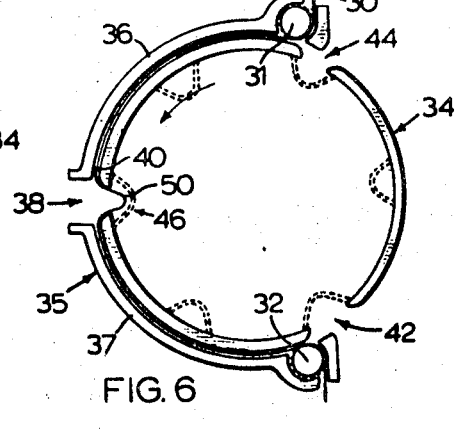

In the position shown in FIG. 1, a loop 48 in the film 30 is located in the opening 42 opposite aperture 38. The film is located on the pin 40 so that the portion of the film between the pin 40 and the inlet sprocket 31 is stationary. As the rotor 34 turns, and the sprockets 31 and 32 continue to transport the film 30, the mechanism moves into the position shown in FIG. 2 in which the loop 48 has decayed somewhat and a new loop 50 is being formed in the opening 46. The film is stationary between the openings 42 and 46 and projection is taking place at this time. As the inlet sprocket 31 continues to feed film into the mechanism the loop 50 grows to take up the excess film. Also, as the outlet sprocket 32 continues to draw film out of the mechanism, the loop 48 decays as the sprocket 32 transports the film. The rotor 34 continues to move and next reaches the position shown in FIG. 3 where the loop 50 is continuing to grow and the loop 48 is decaying. As the loop 50 begins to pass over the pin 40, the film is lifted off the pin so that the film between the loop 50 and outlet sprocket 32 is free to move. The trailing side of the loop 50 then moves over the pin 40 as shown in FIGS. 5 and 6 whereupon the film is again located on the pin 40 and part of the film between loop 50 and inlet sprocket 30 is stopped. Opening 46 is then opposite projection aperture 38.

The excess film in each full loop corresponds to a frame length so that in moving the film off the pin 40 and then re-engaging the pin 40, the film is transported through one frame length. Consequently the position shown in FIG. 6 is similar to that shown in FIG. 1 but with the film transported through one frame length and the rotor moved through one third of a revolution to bring the gap 46 opposite aperture 38.

If the mechanism is to be used in a projector, shutters for interrupting illumination at the required frequency can be provided by simply adding covers over each gap to form primary shutters and by placing similar covers between each pair of gaps to form secondary shutters, as shown in dotted outline in FIG. 6. In this arrangement each frame is projected twice, as first a primary shutter and then a secondary shutter cuts off the light passing through the aperture. However, where it is required to project each frame more than twice, further shutters can be provided suitably spaced around the rotor.

It will be evident from the foregoing description of FIGS. 1 to 6 that when the film is in position opposite aperture 38, the film retains a curvature corresponding substantially to the curvature of the stator 35.

Figure 7:
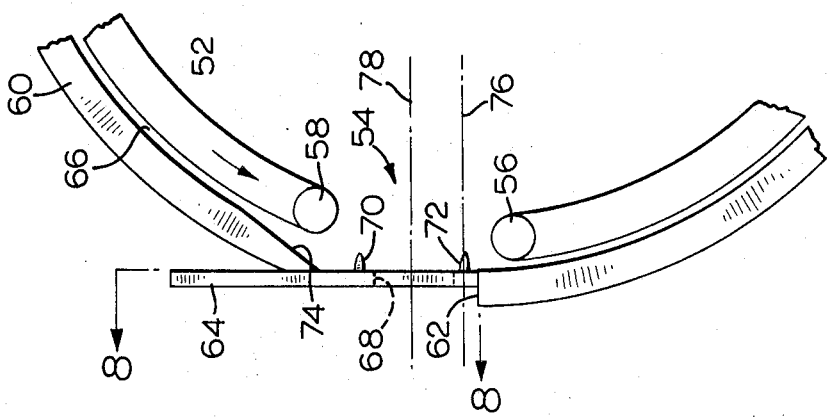
FIG. 7 is a diagrammatic view of a portion of an embodiment of a rolling loop mechanism according to the invention.

Reference is next made to FIG. 7 which illustrates part of a rolling loop mechanism according to one embodiment of the invention and in particular illustrates those parts which differ from the mechanism described with reference to FIGS. 1 to 6. As seen in FIG. 7, a rotor 52 defines a gap 54 bordered by a leading end 56 and a trailing end 58. A stator 60 defines an opening 62 and includes a flat aperture plate 64 positioned in the opening 62 as will be described. The rotor 52 and stator 60 combine to define a passage 66 through which a film is fed by the mechanism. As drawn, the film enters the mechanism at the top of FIG. 7 and is transported downwardly past an aperture 68 in the plate 64.

Figure 8:
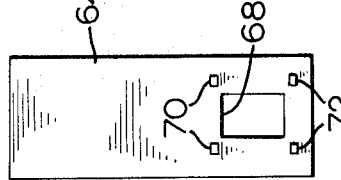
FIG. 8 is a view on lines 8—8 of FIG. 7.

As better seen in FIG. 8, the plate 64 has first and second pairs of fixed pegs 70, 72 for engagement in sprocket openings in the film as will be described. In progressing through the passage 66, the film first passes a portion 74 of the stator which tapers outwardly towards the plate 64, passes the plate 64 and then returns to the passage 66 beyond the plate 64.

The rotor 52 and stator 60 are concentrically curved about an axis lying on a radial line 76 and the plate 64 is positioned tangentially where line 76 meets the inner surface of stator 60. Consequently a line 78 drawn normal to the plate 64 and through the centre of aperture 68 is parallel to the line 76. The distance between lines 76 and 78 is substantially equal to half of the extent of the aperture 68 measured circumferentially about the stator 60. The effect of this arrangement will now be described.

Figure 9:
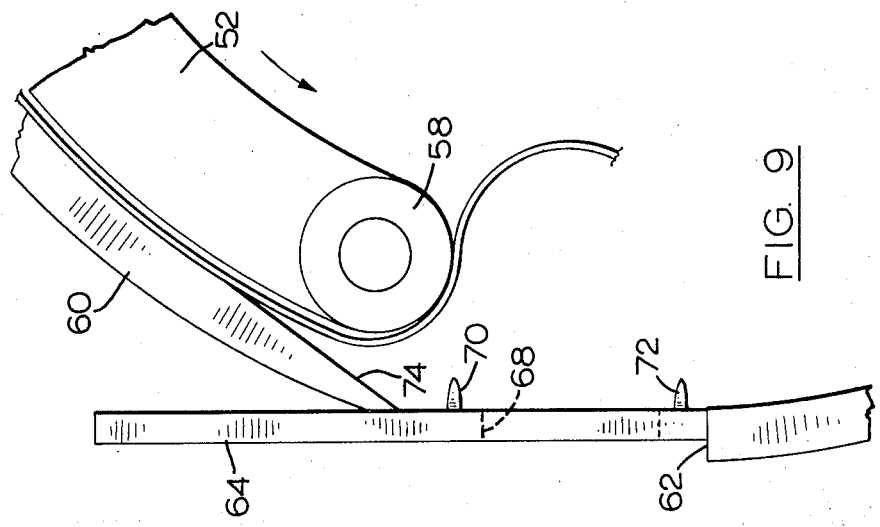

Reference is made to FIGS. 9 to 12 in sequence. As seen in FIG. 9, the trailing end 58 of a gap in the rotor is approaching the aperture and a frame length is being transported past the aperture. A combination of film resilience, inertia and driving force applied at the stator film inlet results in the film tending to move radially towards the plate 64 as shown in FIG. 10. Consequently as the trailing end 58 passes fixed pegs 70, the film engages these pegs and is stopped by the pegs. Continuous force applied at the inlet results in the film lying against plate 64 as shown in FIG. 11.

Further rotor movement lays the film on the second pair of pegs 72. Because the inner surface of the plate is tangential to the inner surface of the stator at the tangency point just beyond pegs 72, there is no force transmitted from the outgoing film to strip the film off the pegs 72. Similarly the continuous force applied on pegs 70 by the incoming film holds the film against the plate about pegs 70. The result is that a film frame is located in a flat condition at aperture 68. The film frame will remain in this condition until it is replaced by the next frame when the next gap in the rotor reaches the aperture repeating the cycle described with reference to FIGS. 9 to 12.

The position of the aperture 68 in the plate 64 can be varied along that part of the plate within opening 62 shown in FIG. 7. However, in order to keep the opening 62 as small as possible it is preferable that the aperture 68 should be positioned immediately adjacent the point of tangency where the radial line 76 meets the inner surface of the stator 60.

In order to accommodate the structure shown in FIGS. 7 to 12 it will be necessary to modify the positions of the inlets and outlets shown in the basic structure of FIGS. 1 to 6. The time taken for a loop to develop is substantially equal to the time taken for the loop to decay and consequently by moving the aperture circumferentially through about half the extent of a frame, the inlet and outlet positions must also be moved in order to ensure proper growth and decay.

Figure 13:
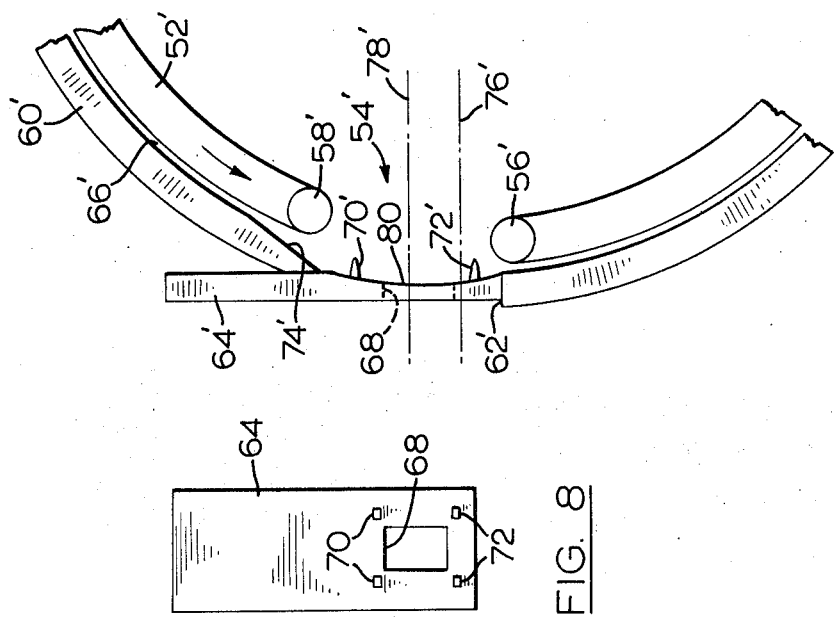
FIG. 13 is a view similar to FIG. 7 of a further embodiment of the invention.

It will be evident that the flat aperture represents a specific curvature as previously described. The curvature of plate 64 can be changed within limits dictated by the requirements of proper film transportation through the mechanism. As seen in FIG. 13 (in which parts corresponding to parts already described are given primed numerals) the plate 64' includes a concave curved surface 80 against which the film will rest. The curvature of this face can be varied and can even have a slight convex curvature if required. In all cases the centre of curvature of the surface 80 (whether it be concave, flat or convex) is spaced from the centre of curvature of the stator as indicated by lines 76 and 78 (FIG. 7) and the surface 80 blends smoothly into the stator at the outlet end of the aperture.

What I claim is:

1. A film transport mechanism for a motion picture machine in which a film is intermittently transported through a predetermined frame length in relation to an aperture, said film transport mechanism comprising: a stator curved about an axis of curvature; a rotor co-operating with said stator to define a passage for said film and rotatable about said axis, said rotor having gaps for receiving film loops; an inlet in said stator through which said film is fed into said passage; an outlet in said stator through which said film is withdrawn from said passage; an aperture plate coupled to the stator intermediate said inlet and said outlet and defining the aperture, the plate including an inner surface having a curvature different from that of the stator, the axis of curvature of the plate surface being parallel to and spaced from the axis of curvature of the stator towards the inlet by an amount substantially equal to half of the circumferential extent of the aperture; film moving means for feeding said film into said inlet at a controlled speed of said rotor and for withdrawal of said film from said outlet at said controlled speed; and film locating means coupled to the stator for co-operating with said film moving means to gradually increase and then gradually decrease said film loop in said gap and to intermittently hold said film in fixed position in registration with said aperture plate surface about the aperture.

2. A film transport mechanism for a motion picture machine in which a film is intermittently transported through a predetermined frame length in relation to an aperture, said film transport mechanism comprising: a stator curved about an axis of curvature; a rotor co-operating with said stator to define a passage for said film and rotatable about said axis, said rotor having gaps for receiving film loops; an inlet in said stator through which said film is fed into said passage; an outlet in said stator through which said film is withdrawn from said passage; an aperture plate coupled to the stator intermediate said inlet and said outlet and defining the aperture, the plate including a flat inner surface positioned tangentially to the curvature of the stator with said surface extending from the point where the surface meets the stator generally towards the inlet; film moving means for feeding said film into said inlet at a controlled speed relative to the speed of said rotor and for withdrawal of said film from said outlet at said controlled speed; and film locating means coupled to the stator for co-operating with said film moving means to gradually increase and then gradually decrease said film loop in said gap and to intermittently hold said film in fixed position in registration with said aperture plate surface about the aperture.

* * * * *